United States Patent
van der Meulen et al.

(10) Patent No.: US 6,705,212 B2
(45) Date of Patent: Mar. 16, 2004

(54) BLOCKFORMER APPARATUS WITH MICROPEENED SURFACE AND METHOD FOR PRODUCING SAME

(75) Inventors: Wieger van der Meulen, Damwoude (NL); Steven Acreman, Wayford Crawkerne (GB)

(73) Assignee: Tetra Laval Holdings & Finance S.A., Pully (CH)

( * ) Notice: Subject to any disclaimer, the term of this patent is extended or adjusted under 35 U.S.C. 154(b) by 15 days.

(21) Appl. No.: 10/072,881

(22) Filed: Feb. 12, 2002

(65) Prior Publication Data

US 2002/0129715 A1 Sep. 19, 2002

(30) Foreign Application Priority Data

Feb. 15, 2001 (NL) ............................................. 1017372

(51) Int. Cl.[7] ............................ A23C 19/00; A01J 25/00
(52) U.S. Cl. ............................. 99/456; 99/458; 99/454
(58) Field of Search .......................... 99/458, 456, 459, 99/454; 264/162, 219; 210/498, 499, 483; 249/113, 134, 112, 141; 72/367.1, 368, 370.19, 370.21, 379.2, 379.6

(56) References Cited

U.S. PATENT DOCUMENTS

| | | | | |
|---|---|---|---|---|
| 4,334,465 A | * | 6/1982 | Brockwell et al. | ............ 99/454 |
| 4,371,490 A | * | 2/1983 | Geessink | .................. 99/458 X |
| 6,098,528 A | | 8/2000 | Hoogland | ..................... 99/454 |
| 6,119,589 A | * | 9/2000 | Hain et al. | ................ 99/456 X |

OTHER PUBLICATIONS

Spangle, C., "Shot Peening of Metal Components"; pp. 1–6.
Steiner, Amelia E., "Cleanability of Stainless Steel Surfaces with Various Finishes"; Dairy, Food and Environmental Sanitation; dtd Apr. 2000, pp. 250–260.
Nagel, C.B.M., (English Abstract attached), The Micropeen Treatment Against Attachment, Contamination and Corrosion; Micropeenen; roestvast staal, Apr. 1991, No. 4, pp. 25–29.
"Tetra Tebel Blockformer," PB62993–00, ® Copyright 2000 Tetra Pak Tebel B.V., Leeuwarden, The Netherlands.

* cited by examiner

Primary Examiner—Reginald L. Alexander

(57) ABSTRACT

A stainless steel structural member for a blockformer apparatus has at least one surface along which in operation curd slides. The at least one surface coming into contact with curd is at least partly a substantially sloping undulating surface, viewed on a microscopic scale, which has been obtained through a micropeening treatment.

22 Claims, 1 Drawing Sheet

BLOCKFORMER APPARATUS WITH MICROPEENED SURFACE AND METHOD FOR PRODUCING SAME

FIELD OF THE INVENTION

This invention relates to a stainless steel structural member for a blockformer apparatus, to a method for manufacturing such a structural member, and to a blockformer apparatus provided with such a structural member.

BACKGROUND OF THE INVENTION

A blockformer apparatus has at least one blockformer tower comprising a drainage column having a substantially closed hollow tubular outer jacket which encloses at least one drainage tube placed at least partly within the outer jacket, which drainage tube is conventionally manufactured from stainless steel. In the part of the drainage tube enclosed by the outer jacket, perforations are provided via which whey originating from a curd column present in the drainage tube can be discharged. Present between the drainage tube and the outer jacket is a substantially annular intermediate space, in which a reduced pressure can be created and via which the whey can be further discharged.

In operation, curd particles are supplied at the upper end of the blockformer tower. The curd particles form a curd column in the drainage tube. The curd column rests on a horizontal guillotine blade disposed at the underside of the drainage tube, which guillotine blade is pulled away at regular times. Before the guillotine blade is pulled away, in a lower chamber situated under the drainage column, an elevator platform is moved up to a point just under the guillotine blade. When the guillotine blade has been pulled away, the elevator platform supports the curd column in the drainage tube. The elevator platform is subsequently moved down over a predetermined distance, whereafter the guillotine blade is returned to its initial position again. The guillotine blade thereby cuts off the lower part of the curd column, so that a cheese block is obtained. The cheese block, optionally after being briefly pressed against the guillotine blade with the aid of the elevator platform, is subsequently discharged for further handling, such as, for instance, pressing, weighing, packaging, cuffing into portions, ripening, etc.

It is noted that the drainage tube and the outer jacket can both have, for instance, a rectangular cross section or can both have, for instance, a circular cross section, but that the drainage tube and the outer jacket can also have different cross-sectional shapes.

As appears from the foregoing, the curd column present in the drainage tube moves down through the drainage tube at regular times over a distance equal to the height of the cut-off blocks. During this downward movement of the curd column, the curd particles are progressively compressed and pressed to form a coherent whole under the influence of the curd column's own weight. In the process, whey is separated, which is discharged via the perforations in the wall of the drainage tube.

From the top down, the curd column therefore become increasingly denser, more solid and drier.

Blockformers have been designed for continuous cheese block production and normally, intermittently, a new amount of curd particles is each time supplied to keep the drainage tube filled to a sufficient extent.

A problem sometimes occurring is that the blocks obtained exhibit cracks. Investigations have shown that such cracks are the result of the static friction arising between the curd column and the inner surface of the wall of the drainage tube. As a result of the static friction, it is possible that a lower section of a curd column already moves down over some distance, while a superjacent section does not yet move down. What also plays a role here is the difference between the static friction coefficient and the dynamic friction coefficient. As a result of the difference in static and dynamic friction coefficient, the so-called stick-slip effect occurs, as a result of which the curd column moves jerkily relative to the wall. As a consequence, the curd column may crack. Depending on the moment at which such cracking or fracture occurs in a curd column, the fracture surfaces can or cannot fuse in a later stage to form an integral entity again.

Comparable problems also occur at other points in a blockformer apparatus where curd parts, or curd blocks or cheese blocks, move relative to a surface of a part of the apparatus. For instance, when a cheese block is being cut off, the guillotine blade moves along curd surfaces both with its top surface and with its bottom surface. When a cheese block is being discharged from the lower chamber, it is moved along side guides and over the elevator platform, so that problems of friction can occur during those operations as well.

SUMMARY OF THE INVENTION

An object of the invention is to provide a solution to the problem outlined, or at least to reduce the problem.

To that end, the present invention is directed to a stainless steel structural member for a blockformer apparatus, which structural member has at least one surface along which, in operation, curd slides, wherein at least part of the at least one surface is a micropeened surface having substantially sloping undulations when viewed on a microscopic scale, said surface having been obtained through a micropeening treatment. Also contemplated is a blockformer apparatus incorporating such a structural member.

The present invention is also directed to a method for manufacturing a stainless steel structural member for use in a blockformer apparatus, which structural member has at least one surface along which, in operation, curd move, the method comprising: at least partly finishing the structural member in a conventional manner to obtain a conventional surface roughness; and then subjecting at least part of said at least one surface to a micropeening treatment.

BRIEF DESCRIPTION OF THE DRAWINGS

In the following, the invention will be further described with reference to the appended drawings in which.

DETAILED DESCRIPTION OF THE PREFERRED EMBODIMENT

Figure 1:
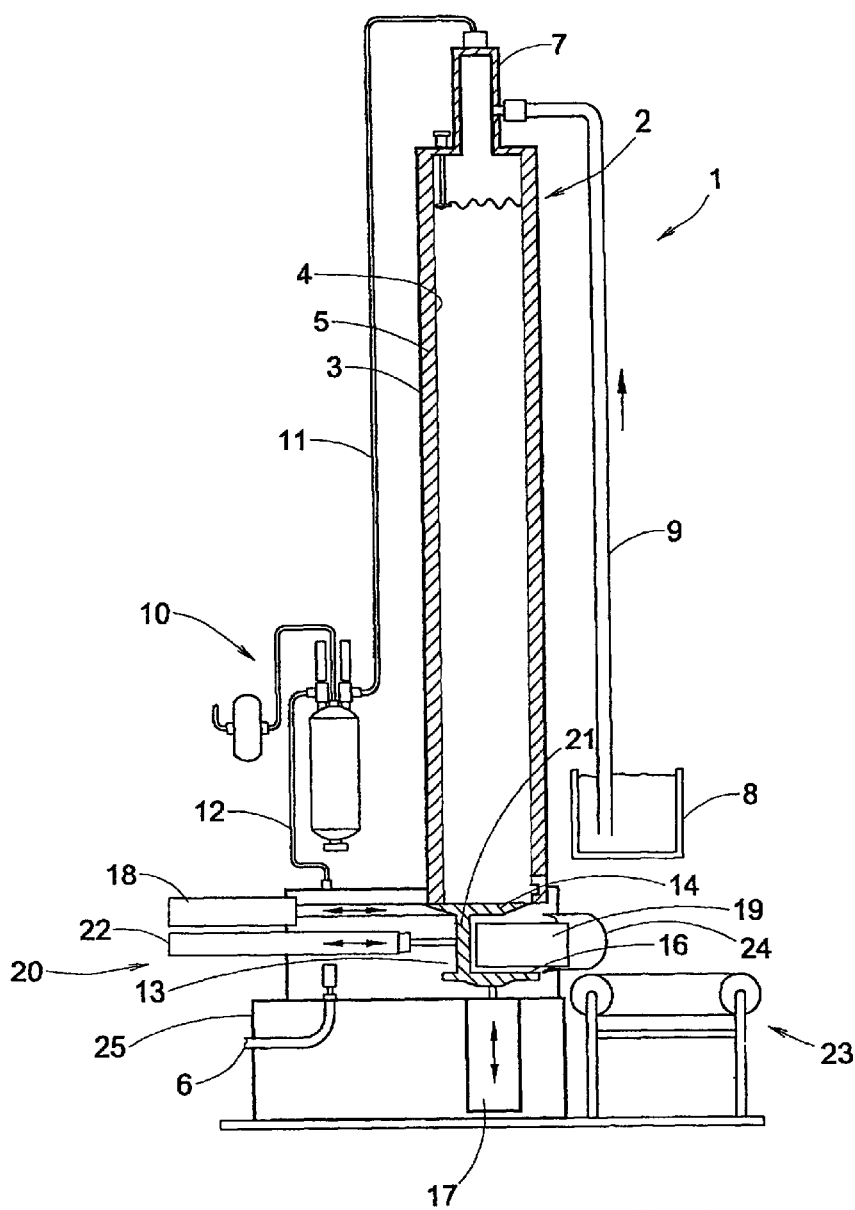
FIG. 1 schematically shows an example of a blockformer apparatus, in which the invention can be applied.

FIG. 1 schematically shows an example of a blockformer tower structure 1, comprising a vertical column 2 having a closed outer jacket 3 and a drainage tube 4 which is perforated, that is, provided with whey discharge openings in the wall, which drainage tube is placed in the outer jacket. Present between the drainage tube and the outer jacket is an annular space 5, in which whey originating from the curd in the drainage tube can collect in order to be removed via one or more discharge channels such as indicated, for instance, at 6, or the like. Via an inlet section 7 situated at the top of the column, curd particles can be supplied from a stock of curd schematically indicated at 8 via a supply line 9 to the column 2 and more particularly to the drainage tube 4. The stock of curd can be provided, for instance, by a cheddaring device.

Connected with the column is a vacuum device 10 which, via suitable vacuum lines, as indicated, by way of example, at 11 and 12, can create a subatmospheric pressure in the column, both in the interior of the drainage tube 4 and in the annular space 5, and also in a chamber 13 under a guillotine blade 14, which is situated at the lower end of the column. The subatmospheric pressure is used to draw in the curd particles during the filling of the tower, and also to discharge the whey from the curd particles and to promote the curd column descending in the drainage tube. Some known blockformer tower structures are so designed that it is possible to cause a different pressure to prevail, for instance, in an upper portion of the column than in a lower portion of the column. Such a blockformer structure is described, for instance, in U.S. Pat. No. 6,098,528. Also, some known blockformer structures have a drainage tube which has a non-perforated portion extending above the outer jacket.

The guillotine blade 14, in the closed position shown, supports the curd column in the drainage tube. Situated under the guillotine blade, in the chamber 13, is a platform 16. A cheese block can be formed by moving the platform with the aid of an elevator device 17 to a point just below the guillotine blade, and subsequently, with the aid of suitable operating means, such as, for instance, a cylinder 18, pulling away the guillotine blade. The curd column then descends onto the platform 16. Thereafter, the platform is moved down until the desired cheese block height is reached, and the guillotine blade is returned to the closed position again, as a result of which a cheese block 19 is cut off. Usually, the platform then moves down a bit further, whereafter the cheese block is pushed off the platform with the aid of an ejector 20, which can comprise, for instance, a pusher plate 21 and an operating cylinder 22. Guide plates may be provided to support and guide the block. The cheese block can be pushed, for instance, onto a discharge conveyor 23, and, if desired, can at the same time be packed in a bag of a suitable material, as shown schematically at 24.

The chamber 13, the elevator device 17 and the ejector 20 are situated in or on an underframe 25 of the blockformer tower structure. It is noted that the above description of the operation of a blockformer tower structure is only an outline which is given with a view to a proper understanding of the invention, but should not be construed in a limiting sense.

Of importance, in particular, is that in a blockformer tower structure of the above-described type, at regular intervals, a curd column moves downwards through the drainage tube. This may give rise to cracks in the curd column, for instance as a result of the so-called stick-slip effect. Such cracks may then be present in the eventually obtained cheese blocks as well, which is undesirable.

It has appeared that the cheese blocks produced exhibit relatively more cracks according as the blockformer apparatus used has a higher production capacity and/or according as the curd particles used are smaller. Reducing the production capacity or the use of exclusively coarser curd particles, however, is not a practical solution to the crack reduction problem.

In experiments, it has appeared that the frictional resistance experienced by the curd column along the inner wall of the drainage tube is an important factor in the formation of cracks in the curd column.

The extent of friction between a curd column and the inner surface of a drainage tube of a blockformer tower is to a large extent determined by the nature of the inner surface of the drainage tube. Conventional is a roughness of this surface which has a roughness value Ra of less than 0.8 $\mu$m. This is the maximum USDA-prescribed Ra value for the roughness of a surface that contacts a dairy product. As indicated hereinabove, even at such a low roughness value, cracking can arise in the curd column and, as a consequence thereof, in the cheese blocks.

According to the invention, the crack formation described can be prevented by having the inner surface of the drainage tub formed as a micropeened surface by undergoing a micropeening treatment (also known as shot peening). Suitable materials for the micropeening treatment are, for instance, round glass beads or steel balls. Preferably, stainless steel balls are used. The dimensions of the beads or balls can be, for instance, between 50 and 5000 $\mu$m or more, in particular between 100 and 1500 $\mu$m. The treatment is preferably carried out on a surface that already has a roughness meeting the relation Ra<0.8 $\mu$m. Although the micropeening treatment leads to an increase of the surface roughness value according to the current measuring methods, it appears nonetheless that after a micropeening treatment of the inner surface of a drainage tube of a blockformer tower, cracking remains largely or even entirely absent.

Figure 2:
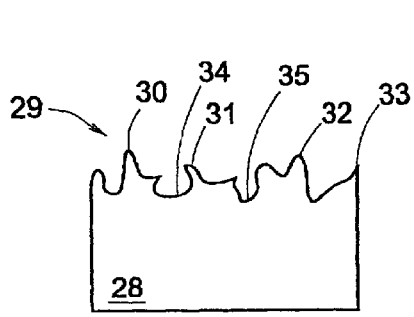
FIG. 2 schematically shows, on an enlarged scale, an example of a ground surface.
Figure 3:
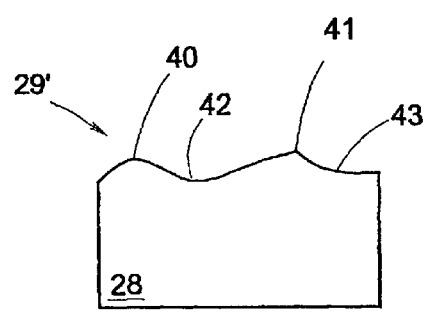
FIG. 3 schematically shows, on an enlarged scale, an example of a surface that has undergone a micropeening treatment.

FIG. 2 shows an example of a surface 29 of a piece a metal 28 such as it looks on a microscopic scale after a traditional treatment by, for instance, grinding, brushing, polishing and the like. FIG. 3 shows the same surface 29', again on a microscopic scale, after a micropeening treatment. Although after the treatment the Ra value has increased, at the same time the surface, on a microscopic scale, has become more sloping. The sharp peaks and cracks present in FIG. 2, for instance at 30 to 33 and 34, 35, respectively, are gone after the micropeening treatment, having been replaced by a much more rounded shape with undulating hills 40, 41 and valleys 42, 43. Thus, as seen in FIG. 3, the spacing between peaks of the undulating hills 40, 41 is greater than the difference in heights between the peaks and the valleys 42, 43.

In practical tests, good results have been obtained with stainless steel balls of a diameter (in the order) of 0.7 mm.

It is supposed that the favorable effect of a micropeening treatment can be explained in that as a result of the acquired sloping, undulating surface, adhesion between the curd molecules and the stainless steel molecules is reduced.

It is noted that when glass beads are used, the treatment should be done exclusively with new, or at least substantially undamaged, glass beads. Used glass beads are often damaged and then have angular surfaces and sharp edges. With such reused glass beads, the flowing surface contemplated is not obtained or is obtained to an insufficient extent.

An additional advantage of the micropeening treatment described is that as a result of the disappearance of pits, crevices, cracks, and the like, in fact a more hygienic surface is obtained, with fewer possibilities for bacteria to lodge between unevennesses, or for contaminating substances to adhere.

The micropeening treatment is preferably carried out as the last or one of the last operations on a drainage tube, that is, after the tube has been formed and the perforations have been provided.

To determine whether the treatment has been intensive enough, the so-called Almen test or the so-called Cotton test can be used. For the application described, the cotton test seems the most suitable. In this test, a swab of cotton wool is brushed along the treated surface to see if any fluff remains behind. If any fluff remains behind, the surface still has sharp points and/or edges and treatment has been inadequate. The test can be performed on the surface of the drainage tube itself, but typically a test strip of the same material is used. When with the aid of a test strip and the cotton test or any other suitable test the proper parameters for the treatment have been determined (for instance, bead size, bead material, air pressure in the micropeening equipment, duration, etc.), the object itself can then be treated next.

As already noted, the micropeening treatment is also applicable for other parts of a blockformer where curd parts move relative to a machine surface, such as, for instance, the guillotine blade, the elevator platform, guides for the cut-off block, etc. The guillotine blade has two surfaces that slide along curd during cutting. Both surfaces or parts thereof can be subjected to a micropeening treatment to reduce problems of friction. The curd engaging surfaces (or part(s) thereof) of the elevator platform, the guides for the cut-off block and any other parts of the blockformer apparatus can also have undergone a micropeening treatment.

What is claimed is:

1. A stainless steel structural member for a blockformer apparatus, which structural member has at least one surface along which, in operation, curd slides,
   wherein at least part of the at least one surface is a micropeened surface having substantially sloping undulations when viewed on a microscopic scale, said surface having been obtained through a micropeening treatment.

2. A stainless steel structural member according to claim 1, wherein the micropeening treatment has been carried out with stainless steel balls.

3. A stainless steel structural member according to claim 1, wherein the micropeening treatment has been carried out with substantially undamaged round glass beads.

4. A blockformer apparatus having incorporated therein a stainless steel structural member having at least one surface along which, in operation, curd slides,
   wherein at least part of the at least one surface is a micropeened surface having substantially sloping undulations when viewed on a microscopic scale, said surface having been obtained through a micropeening treatment.

5. A blockformer apparatus according to claim 4, further comprising a guillotine blade having a micropeened surface.

6. A blockformer apparatus according to claim 4, further comprising either an elevator platform, or a guide means, or both, having a micropeened surface.

7. A blockformer apparatus according to claim 4, wherein the at least one structural member is a stainless steel drainage tube having an inner micropeened surface.

8. A blockformer apparatus according to claim 7, further comprising a guillotine blade having a micropeened surface.

9. A blockformer apparatus according to claim 7, further comprising either an elevator platform, or a guide means, or both, having a micropeened surface.

10. A method for manufacturing a stainless steel structural member for use in a blockformer apparatus, which structural member has at least one surface along which, in operation, curd moves, comprising:
    at least partly finishing the structural member in a conventional manner to obtain a conventional surface roughness; and
    subjecting at least part of said at least one surface to a micropeening treatment.

11. A method according to claim 10, wherein said micropeening treatment uses stainless steel balls.

12. A method according to claim 11, wherein said stainless steel balls have a diameter between 50 and 5000 $\mu$m.

13. A method according to claim 12, wherein said stainless steel balls have a diameter between 100 and 1500 $\mu$m.

14. A method according to claim 13, wherein said stainless steel balls have a diameter between 600 and 800 $\mu$m.

15. A method according to claim 14, wherein said stainless steel balls have a diameter of approximately 700 $\mu$m.

16. A method according to claim 10, wherein said micropeening treatment uses substantially undamaged round glass beads.

17. A method according to claim 16, wherein said stainless steel balls have a diameter between 50 and 5000 $\mu$m.

18. A method according to claim 17, wherein said stainless steel balls have a diameter between 100 and 1500 $\mu$m.

19. A method according to claim 18, wherein said stainless steel balls have a diameter between 600 and 800 $\mu$m.

20. A method according to claim 19, wherein said stainless steel balls have a diameter of approximately 700 $\mu$m.

21. A metal structural member for a blockformer apparatus, which structural member has at least one surface along which, in operation, curd slides,
    wherein at least part of the at least one surface is a micropeened surface having substantially sloping undulations when viewed on a microscopic scale, said surface having been obtained through a micropeening treatment.

22. A blockforming apparatus for preparing blocks comprising curd, the apparatus comprising:
    a column comprising first and second spaced apart ends, curd being received at the first end of the column and passing along an interior thereof toward the second end of the column; and
    a cutting blade configured to separate a portion of curd that has passed along the interior of the column from curd remaining within the column, the cutting blade having a micropeened surface comprising microscopic substantially sloping undulations.

* * * * *